United States Patent
Seok et al.

(10) Patent No.: US 9,928,876 B2
(45) Date of Patent: Mar. 27, 2018

(54) RECORDING MEDIUM RECORDED WITH MULTI-TRACK MEDIA FILE, METHOD FOR EDITING MULTI-TRACK MEDIA FILE, AND APPARATUS FOR EDITING MULTI-TRACK MEDIA FILE

(71) Applicant: VOCOO INC., Daegu-si (KR)

(72) Inventors: Cheol Seok, Daegu (KR); Ho-Kwang Choi, Gyeonggi-do (KR)

(73) Assignee: VOCOO INC., Daegu-si (KR)

( * ) Notice: Subject to any disclaimer, the term of this patent is extended or adjusted under 35 U.S.C. 154(b) by 101 days.

(21) Appl. No.: 14/889,911

(22) PCT Filed: Apr. 11, 2014

(86) PCT No.: PCT/KR2014/003140
§ 371 (c)(1),
(2) Date: Nov. 9, 2015

(87) PCT Pub. No.: WO2014/181969
PCT Pub. Date: Nov. 13, 2014

(65) Prior Publication Data
US 2016/0093333 A1    Mar. 31, 2016

(30) Foreign Application Priority Data

May 7, 2013  (KR) .................. 10-2013-0051444

(51) Int. Cl.
*G11B 27/00* (2006.01)
*G11B 27/034* (2006.01)
(Continued)

(52) U.S. Cl.
CPC .......... *G11B 27/034* (2013.01); *G11B 27/031* (2013.01); *G11B 27/10* (2013.01);
(Continued)

(58) Field of Classification Search
CPC . H04N 9/8205; G11B 27/034; G11B 27/3027
(Continued)

(56) References Cited

U.S. PATENT DOCUMENTS

2007/0094290 A1* 4/2007 Oka .................. G11B 20/10
2013/0325154 A1* 12/2013 Oh .................... G10L 21/14
700/94

FOREIGN PATENT DOCUMENTS

KR   10-2004-0065783 A    7/2004
KR      10-0932778 B1    12/2009
(Continued)

OTHER PUBLICATIONS

International Search Report for PCT/KR2014/003140.

*Primary Examiner* — Thai Tran
*Assistant Examiner* — Jose Mesa
(74) *Attorney, Agent, or Firm* — The PL Law Group, PLLC (57) ABSTRACT

A recording medium recorded with a multi-track media file, a method for editing a multi-track media file and an apparatus for editing a multi-track media file. The apparatus for editing a media file stores a multi-track media file including an audio track and an video track corresponding to the audio track, receives an output adjustment command for adjusting an output of an audio or video track, generates a volume adjustment value according to the output adjustment command, and records the generated volume adjustment value in the multi-track media file, thereby realizing the present invention. According to the present invention, users may produce his/her own unique multimedia file by editing according to his/her taste, for example, by inserting his/her voice, in place of an existing audio, into a multimedia file such as a music video file, or inserting a video taken on his/her own, in place of an existing video, thereinto.

10 Claims, 5 Drawing Sheets

(51) Int. Cl.
  *G11B 27/30* (2006.01)
  *H04N 5/91* (2006.01)
  *H04N 9/79* (2006.01)
  *H04N 9/82* (2006.01)
  *G11B 27/031* (2006.01)
  *G11B 27/10* (2006.01)

(52) U.S. Cl.
  CPC ............ *G11B 27/3027* (2013.01); *H04N 5/91* (2013.01); *H04N 9/7921* (2013.01); *H04N 9/8205* (2013.01)

(58) Field of Classification Search
  USPC ........................................................ 386/285
  See application file for complete search history.

(56) References Cited

FOREIGN PATENT DOCUMENTS

KR  10-101123865 B1  3/2012
KR  10-101218801 B1  1/2013

\* cited by examiner

RECORDING MEDIUM RECORDED WITH MULTI-TRACK MEDIA FILE, METHOD FOR EDITING MULTI-TRACK MEDIA FILE, AND APPARATUS FOR EDITING MULTI-TRACK MEDIA FILE

This application claims benefit under 35 U.S.C. 119(e), 120, 121, or 365(c), and is a National Stage entry from International Application No. PCT/KR2014/003140, filed Apr. 11, 2014, which claims priority to and the benefit of Korean Patent Application No. 10-2013-0051444 filed in the Korean Intellectual Property Office on May 7, 2013, the entire contents of which are incorporated herein by reference.

TECHNICAL FIELD

The present invention relates to a recording medium recorded with a multi-track media file, a method for editing a multi-track media file and an apparatus for editing a multi-track media file, and more specifically, to a recording medium recorded with a multi-track media file, a method for editing a multi-track media file and an apparatus for editing a multi-track media file which enable a user to produce his/her own unique multimedia file by editing in a variety of ways according to his/her taste, for example, by inserting his/her voice, in place of an existing audio, into a multimedia file such as a music video file, or inserting a video taken on his/her own, in place of an existing video, thereinto.

BACKGROUND ART

In recent years, many people use the Internet with the development of a high-speed data communication network, and users may easily contact various multimedia files with an increase in use of the Internet. That is, the users may access a specific server through the Internet anytime and may easily download the multimedia file such as a music video file.

Meanwhile, there is a technical demand for enabling the user to possess his/her own unique multimedia file by editing in a variety of ways according to his/her taste, for example, by inserting his/her voice, in place of an existing audio, into the multimedia file such as the music video file, or inserting a video taken on his/her own, in place of an existing video, thereinto. However, a technique of satisfying the technical demand of the users has not yet been developed.

SUMMARY

Accordingly, it is an object of the present invention to provide a recording medium recorded with a multi-track media file, a method for editing a multi-track media file and an apparatus for editing a multi-track media file which enable a user to produce his/her own unique multimedia file by editing in a variety of ways according to his/her taste, for example, by inserting his/her voice, in place of an existing audio, into a multimedia file such as a music video file, or inserting a video taken on his/her own, in place of an existing video, thereinto.

According to one aspect of the present invention, there is provided a recording medium recorded with a multi-track media file which reproduces at least one audio file and at least one video file corresponding to the audio file, including: a data part having a structure in which each frame of the audio file and each frame of the video file corresponding thereto are adjacently coupled with each other; and a header part which represents information on the total number of the audio files, and information on the total number of the video files, wherein at least one of each frame of the audio files and each frame of the video files is provided with a frame header part which represents output adjustment values of each frame.

Preferably, the frame header part includes information on file types of the frame included in the frame header part.

In addition, according to another aspect of the present invention, there is provided a method for editing a multi-track media file, including: (a) storing, by an apparatus for editing a media file, the multi-track media file including at least one audio track and at least one video track corresponding to the audio track; (b) receiving, by the apparatus for editing a media file, an audio signal and/or a video signal from the outside; and (c) additionally generating, by the apparatus for editing a media file, an audio track and/or a video track according to the audio signal and/or the video signal input in the step (b) in the multi-track media file.

Preferably, the method further includes: (d) receiving, by the apparatus for editing a media file, an output adjustment command of the audio track and/or the video track from a user.

In addition, the method may further include: (e) generating, by the apparatus for editing a media file, a volume adjustment value according to the output adjustment command.

In addition, the method may further include: (f) recording, by the apparatus for editing a media file, the generated volume adjustment value in the multi-track media file.

Further, according to another aspect of the present invention, there is provided an apparatus for editing a multi-track media file, including: a storage unit configured to store the multi-track media file including at least one audio track and at least one video track corresponding to the audio track; an input unit configured to receive an audio signal and/or a video signal from an outside; and an editing unit configured to additionally generating an audio track and/or a video track according to the audio signal and/or the video signal input to the input unit in the multi-track media file.

Preferably, the input unit receives an output adjustment command of the audio track and/or the video track from a user.

In addition, the editing unit may generate a volume adjustment value according to the output adjustment command.

Further, the editing unit may record the generated volume adjustment value in the multi-track media file.

Furthermore, according to another aspect of the present invention, there is provided an apparatus for editing a multi-track media file, including: a storage unit configured to store the multi-track media file including at least one audio track and at least one video track corresponding to the audio track; an input unit configured to receive an output adjustment command of the audio track and/or the video track from a user; and an editing unit configured to generate a volume adjustment value according to the output adjustment command and record the generated volume adjustment value in the multi-track media file.

According to the present invention, the user may produce his/her own unique multimedia file by editing in a variety of ways according to his/her taste, for example, by inserting his/her voice, in place of an existing audio, into a multimedia file such as a music video file, or inserting a video taken on his/her own, in place of an existing video, thereinto.

DETAILED DESCRIPTION

Hereinafter, the present invention will be described in more detail with reference to accompanying drawings. In the drawings, same reference numerals denote same components throughout the disclosure. Known functions and configurations which may unnecessarily obscure the gist of the present invention will not be described.

Figure 1:
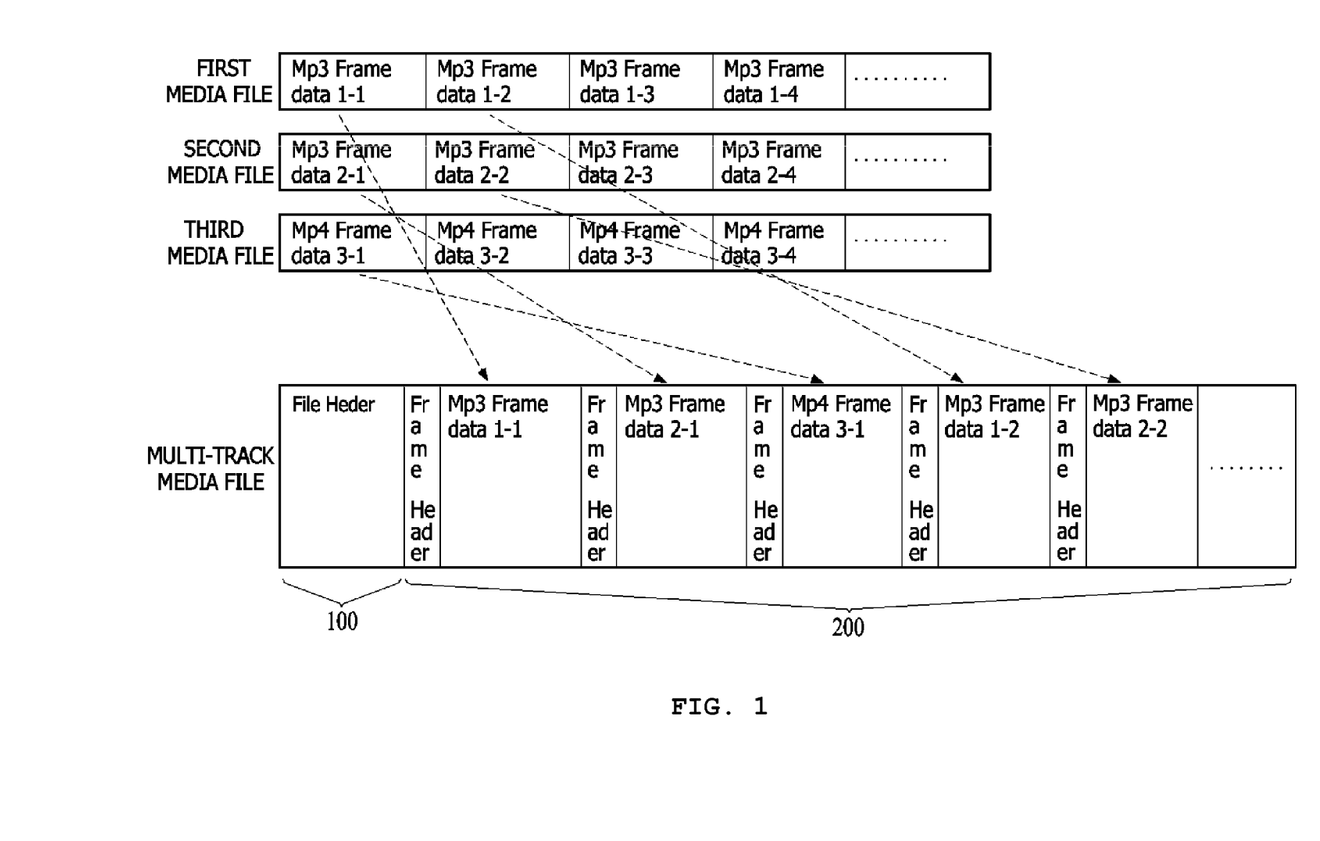
FIG. 1 is a view illustrating a structure of a multi-track media file according to an embodiment of the present invention.

FIG. 1 is a view illustrating a structure of a multi-track media file according to an embodiment of the present invention. Referring to FIG. 1, the multi-track media file according to the embodiment of the present invention has a structure in which a first media file (audio file) which is a vocal MP3 file in which only vocal is stored, a second media file (audio file) which is a music recorded (MR) MP3 file in which only an accompaniment corresponding to the vocal is stored, and a third media file (video file) which is a background moving picture file of the accompaniment and the vocal such as an image of music video are synthesized with each other.

As illustrated in FIG. 1, the multi-track media file in which the first media file, the second media file, and the third media file are synthesized with each other includes a header part 100 and a data part 200, and the data part 200 has a structure in which each frame of the first media file, each frame of the second media file, and each frame of the third media file are adjacently coupled with each other.

Specifically, a first frame data 1-1 of the first media file is followed by a first frame data 2-1 of the second media file corresponding thereto with being adjacently connected thereto, and the first frame data 2-1 of the second media file is followed by a first frame data 3-1 of the third media file corresponding to the first frame data 1-1 of the first media file and the first frame data 2-1 of the second media file with being connected thereto.

Next, a second frame data 1-2 of the first media file, a second frame data 2-2 of the second media file, and a second frame data 3-2 of the third media file are adjacently connected thereto.

Figure 2:
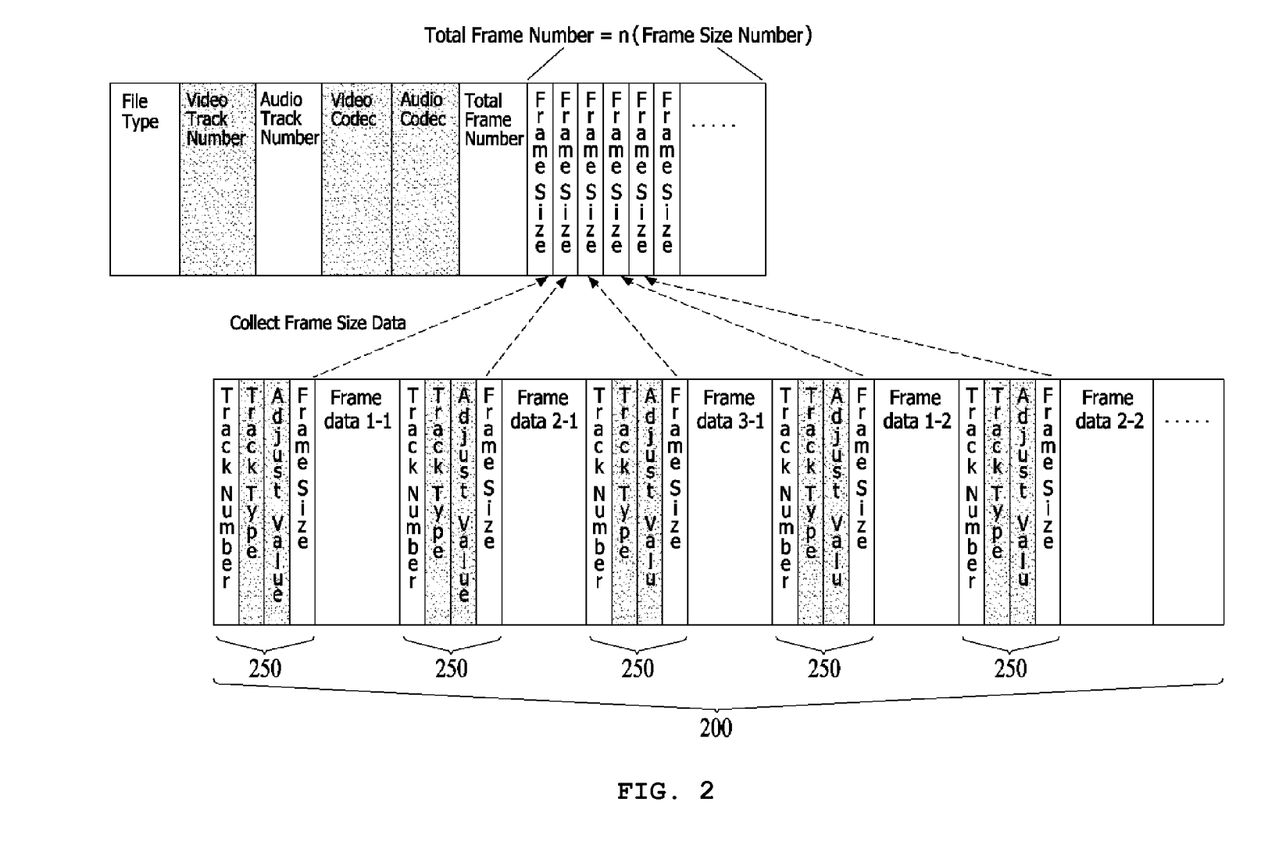
FIG. 2 is a view illustrating in more detail the structure of the multi-track media file according to the embodiment of the present invention.

FIG. 2 is a view illustrating in more detail the structure of the multi-track media file according to the embodiment of the present invention in FIG. 1. Referring to FIG. 2, the header part 100 of the multi-track media file is stored with information on file types (File Type), information on the total number of synthesized video files (Video Track Number), information on the total number of synthesized audio files (Audio Track Number), information on codecs of the synthesized video files (Video Codec), information on codecs of the synthesized audio files (Audio Codec), information on the total number of the frames in the data part 200 (Total Frame Number), and information on sizes of each frame (Frame Size).

Specifically, the information on file types (File Type) represents a file type differentiated from a general multimedia file, the information on codecs of the synthesized video files (Video Codec) may be MP4, MPEG4, H.264, WMV, etc., and the information on codecs of the synthesized audio files (Audio Codec) may be MP3, AAC, OGG, WMA, etc.

Further, the information on sizes of each frame (Frame Size) stored in the header part 100 may be utilized when executing 30 second skipping, etc., by an operation of a user during reproducing the multi-track media file.

Meanwhile, referring to FIG. 2, each frame in the first to third media files included in the data part 200 of the multi-track media file according to the present invention is provided with a frame header part 250. The frame header part 250 is stored with information on tracks of each frame (Track Number), track types of each frame (Track Type), output adjustment values for each frame (Adjust Value), and information sizes of each frame (Frame Size).

Figure 3:
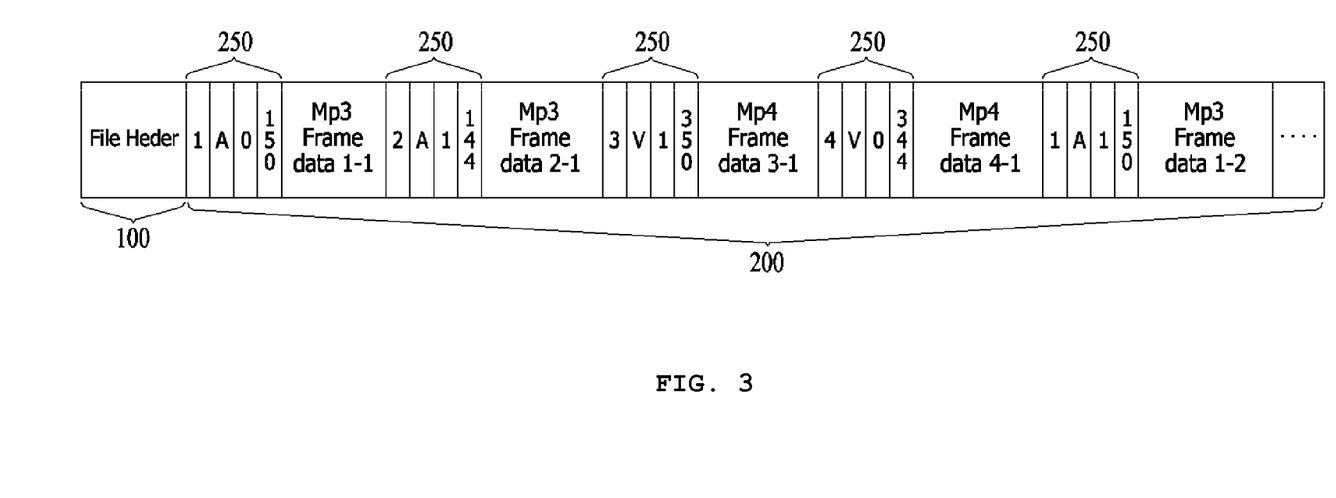
FIG. 3 is a view illustrating in detail a structure of a multi-track media file according to another embodiment of the present invention.

FIG. 3 is a view illustrating in detail a structure of a multi-track media file according to another embodiment of the present invention. Meanwhile, the multi-track media file in FIG. 3 has a form in which a fourth media file which is a video file is added to the multi-track media file in FIG. 1.

The detailed structure of the frame header part 250 will be described with reference to FIGS. 2 and 3. The information on tracks of each frame (Track Number) means media file numbers 1, 2, 3, etc., in FIG. 1 of the corresponding frame, the track types of each frame (Track Type) means a type of media files of the corresponding frame such as a video V or an audio A, and the output adjustment values for each frame (Adjust Value) are values defined in a range from 0 to 1. For example, it means that when the output adjustment value is 0.7, the output for the corresponding frame is adjusted to be 70%, and when the output adjustment value is 0, the output for the corresponding frame is set to be 0%, and when the output adjustment value is 1, the output for the corresponding frame is set to be 100%.

Further, the information on sizes of each frame included in each frame header part of the data part 200 coincides with the information on sizes of each frame stored in the header part 100 included in the data part 200.

Figure 4:
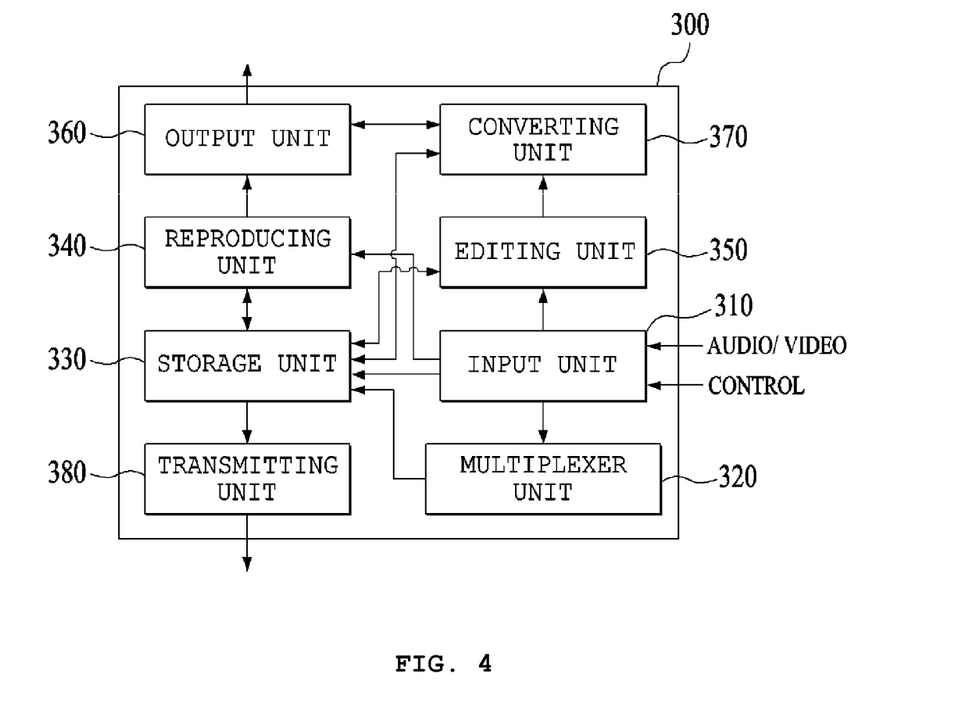
FIG. 4 is a functional block diagram illustrating a structure of an apparatus 300 for editing a multi-track media file according to the present invention.

FIG. 4 is a functional block diagram illustrating a structure of an apparatus 300 for editing a multi-track media file according to the present invention. Referring to FIG. 4, the apparatus 300 for editing a multi-track media file according to the present invention includes an input unit 310, a multiplexer unit 320, a storage unit 330, a reproducing unit 340, an editing unit 350, an output unit 360, a converting unit 370, and a transmitting unit 380.

First, the input unit 310 of the apparatus 300 for editing a multi-track media file includes an input panel to which various control commands for the apparatus 300 for editing a multi-track media file are input from the user, an audio input terminal such as a microphone terminal to which external audio signals are input, and a video input terminal to which external video signals are input.

In addition thereto, general audio data and general video data are input through the input unit 310, and the multiplexer unit 320 generates the multi-track media file having the structure as illustrated in FIG. 1 by using the general audio data and the general video data.

Meanwhile, the storage unit 330 is stored with the general audio data, the general video data input through the input unit 310, and the multi-track media file generated by the multiplexer unit 320.

The reproducing unit 340 simultaneously reproduces independently each track in the multi-track media file stored in the storage unit 330, and the tracks independently reproduced by the reproducing unit 340 are simultaneously output through the output unit 360 to be transmitted to the user.

Further, when the output adjustment command for a specific frame in a specific audio track or a specific video track is input from the user through the input unit 310, the editing unit 350 generates the output adjustment value according to the corresponding output adjustment command and records the generated output adjustment value in the frame header part 250 of the corresponding frame.

Specifically, the output adjustment value is generated as a value from '0' to '1.' When the user adjusts the output value of the specific frame in the specific audio track or the specific video track to a maximum output of 100%, the output adjustment value is generated as '1,' and when the user adjusts the output value to 0%, the output adjustment value is generated as '0.'

Meanwhile, the converting unit 370 serves to convert the multi-track media file stored in the storage unit 330 into a general multi-media file which may be reproduced even in a general reproducing apparatus, and the transmitting unit 380 serves to transmit the general multi-media file converted and generated by the converting unit to external devices.

Figure 5:
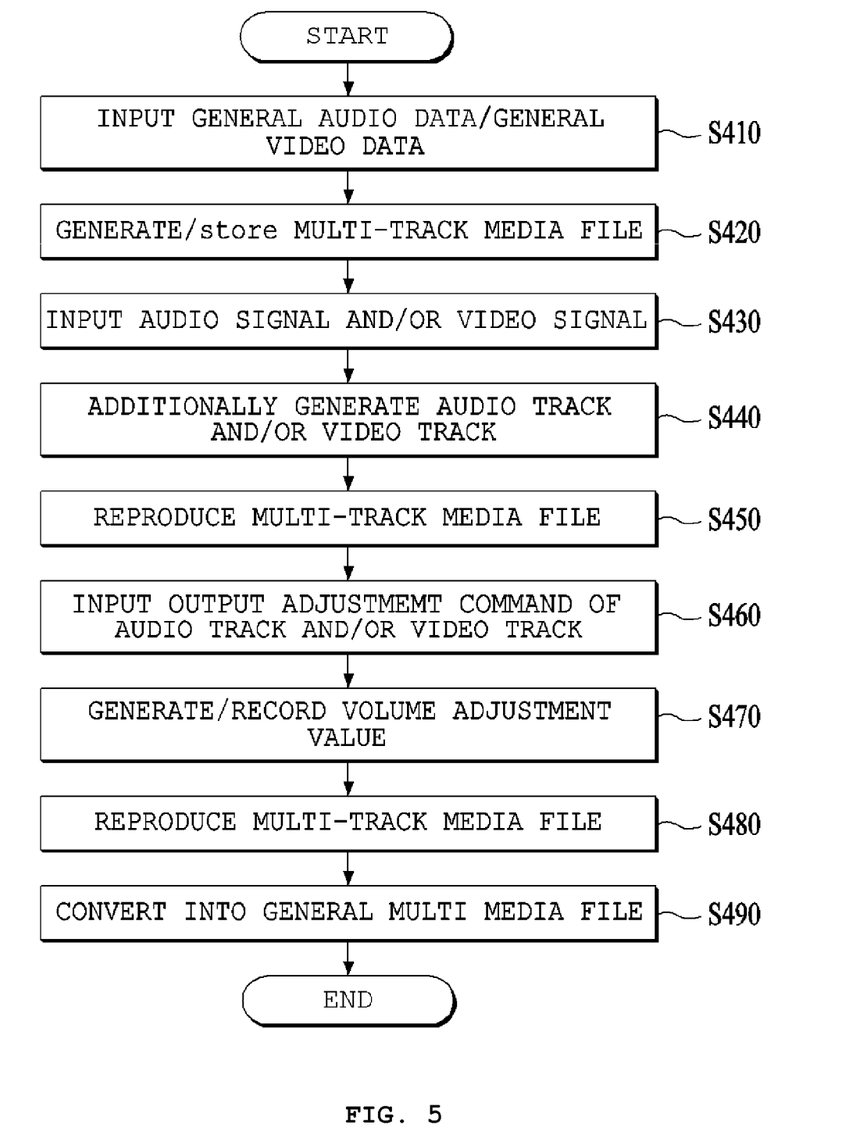
FIG. 5 is a flow chart describing an execution process of a method for editing a multi-track media file according to the present invention.

FIG. 5 is a flow chart describing an execution process of a method for editing a multi-track media file according to the present invention. The method for editing a multi-track media file according to the present invention will be described with reference to FIGS. 1 to 5. First, at least one general audio data and at least one general video data such as the first media file (audio file), the second media file (audio file), and the third media file (video file), etc., in FIG. 1 are input through the input unit 310 of the apparatus 300 for editing a multi-track media file (S410), and the input data are stored in the storage unit 330.

Next, the multiplexer unit 320 processes multiplexing on the first media file to the third media file, etc., in FIG. 1 to generate the multi-track media file, and the generated multi-track media file is stored in the storage unit 330 (S420).

Meanwhile, a structure of the multi-track media file which is generated by using two general audio data and two general video data may be formed as illustrated in FIG. 3.

Next, the user inputs an audio signal or a video signal through the input unit 310 to add the audio track or the video track to the multi-track media track generated in the above-described step S420 (S430).

Specifically, the user may sing a song included in the multi-track media file though a microphone connected to the input terminal of the apparatus 300 for editing a multi-track media file to input his/her voice as the audio signal, and may photograph a background image of the song included in the multi-track media file through a camera module connected to the input terminal of the apparatus 300 for editing a multi-track media file to input the video signal.

Therefore, the editing unit 350 additionally generates the media files having the same formats as the first media file to the third media file in FIG. 1 based on the input audio signal or the video signal, and reflects the additionally generated media file to the multi-track media file previously generated in the above-described step S420 depending on the format in FIG. 1 to generate the modified multi-track media file and stores the modified and generated multi-track media file in the storage unit 330 (S440).

Meanwhile, the user inputs a reproduction command of the multi-track media file modified and generated in the above-described step S440 through the input panel of the input unit 310, and thus the reproducing unit 340 reproduces the modified and generated multi-track media file (S450).

In detail, the reproducing unit 340 of the apparatus 300 for editing a multi-track media file parses each frame data in a plurality of audio tracks included in the modified and generated multi-track media file, and then mixes them to reproduce the audio file, as well as parses each frame data in a plurality of video tracks included in the modified and generated multi-track media file, and then mixes them to reproduce the video file.

Therefore, the user inputs the output adjustment command for each of the video tracks and/or each of the audio tracks through the input panel of the input unit 310, while viewing and listening the video file and the audio file included in the multi-track media file, which are output through the output unit 360 (S460).

Specifically, while the reproduction in the reproducing section including an Mp3 frame Data 1-1 (first audio file), an Mp3 frame Data 2-1 (second audio file), an Mp4 frame Data 3-1 (first video file), an Mp4 frame Data 4-1 (second video file) is performed, if the user adjusts the output of the first audio file to be 0, the output of the second audio file to be 100%, the output of the first video file to be 0, and the output of the second vide file to be 100%, as illustrated in FIG. 3, the editing unit 350 generates and records the output adjustment value for the Mp3 frame Data 1-1 (first audio file) as 0, the output adjustment value for the Mp3 frame Data 2-1 (second audio file) as 1, the output adjustment value for the Mp4 frame Data 3-1 (first video file) as 0, and the output adjustment value for the Mp4 frame Data 4-1 (second video file) as 1, respectively (S470).

As in the above-described step S470, the multi-track media file having the output adjustment value generated by the editing unit 350 and recorded therein is stored in the storage unit 330, which is reproduced by the reproducing unit 340 according to the control command input through the input panel from the user later (S480).

In detail, the reproducing unit 340 of the apparatus 300 for editing a multi-track media file adjusts the output depending on the output adjustment value recorded in the frame header part 250 of each frame data, when parsing each frame data in the plurality of audio tracks included in the multi-track media file having the output adjustment value recorded therein, and then mixing and reproducing them.

Specifically, the Mp3 frame Data 1-1 (first audio file) having the output adjustment value recorded as 0 is not output, and the Mp3 frame Data 2-1 (second audio file) having the output adjustment value recorded as 1 is output to 100%.

Further, the Mp4 frame Data 3-1 (first video file) having the output adjustment value recorded as 0 is not output, and the Mp4 frame Data 4-1 (second video file) having the output adjustment value recorded as 1 is output to 100%.

Meanwhile, if the output adjustment value of the Mp4 frame Data 3-1 (first video file) is recorded as 0.3, and the output adjustment value of the Mp4 frame Data 4-1 (second video file) is recorded as 0.7, a ratio of the image output by the Mp4 frame Data 3-1 (first video file) and the image output by the Mp4 frame Data 4-1 (second video file) in the corresponding reproducing section is 3:7, and two images are output while overlapping with each other.

Meanwhile, in the above-described step S460, the output adjustment value is additionally adjusted in a reproducing section including an Mp3 frame Data 1-2 (first audio file), an Mp3 frame Data 2-2 (second audio file), an Mp4 frame Data 3-2 (first video file), an Mp4 frame Data 4-2 (second video file) which is subsequent to the reproducing section including the Mp3 frame Data 1-1 (first audio file), the Mp3 frame Data 2-1 (second audio file), the Mp4 frame Data 3-1 (first video file), and the Mp4 frame Data 4-1 (second video file), such that the user may adjust the output state of the specific audio or video file in a row.

For example, when the output adjustment value of the Mp3 frame Data 1-1 (first section of the first audio file) is set to be 0, then the output adjustment value of the Mp3 frame Data 1-2 (second section of the first audio file) is set to be 0.5, and the Mp3 frame Data 1-3 (third section of the first audio file) is set to be 1, the output level of the first audio file is gradually increased from 0 to 100% during passing through the first section to the third section upon the reproduction in the above-described step S480.

Further, when the user sets the output adjustment value of the Mp4 frame Data 4-1 (first section of the second audio file) to be 1, then the output adjustment value of the Mp4 frame Data 4-2 (second section of the second video file) to be 0.5 and the output adjustment value of the Mp4 frame Data 4-3 (third section of the second audio file) to be 0, the output level of the first audio file is gradually reduced from 100% to % during passing through the first section to the third section upon the reproduction in the above-described step S480. Thereby, it is possible to show an effect of fade out on a screen of the output unit 360.

On the other hand, when the user sets the output adjustment value of the Mp4 frame Data 3-1 (first section of the first video file) to be 0, then the output adjustment value of the Mp4 frame Data 3-2 (second section of the first video file) to be 0.5, and the output adjustment value of the Mp4 frame Data 3-3 (third section of the first video file) to be 1, the output level of the first video file is gradually increased from 0% to 100% during passing through the first section to the third section upon the reproduction in the above-described step S480. Thereby, it is possible to show an effect of fade in on the screen of the output unit 360.

Further, in performing the present invention, the above-described steps S430 to S440 may be omitted, and the above-described steps S450 to S470 may be immediately performed, while the process of additionally generating the audio track or the video track in the multi-track media file stored in the storage unit 330 is not performed in the above-described step S420.

Meanwhile, the multi-track media file stored in the storage unit 330 in the above-described step S470 includes the file structure which may not be performed in the general media reproducing apparatus, and therefore according to the present invention, the reproducing unit 340 reproduces the multi-track media file stored in the storage unit 330 in the above-described step S470 (S480), and the converting unit 370 performs capturing on the audio output signal and the video output signal which are finally mixed and output through the output unit 360, and converts the captured audio output signal and video output signal into general multimedia moving picture files such as MP4, AVI, WMV, or the like (S490).

That is, by the above method, the user may produce the moving picture UCC to which his/her editing contents are applied, and the produced moving picture UCC may be transmitted to the external devices through the transmitting unit 380 to be published on Youtube, SNS, Internet sites, etc.

Although preferred embodiments and applications of the present invention have been described above, the present invention should not be construed as being limited to the above described specific embodiments and applications, but may be variously modified and embodied by a person having ordinary skill in the art to which the present invention pertains without departing from the gist of the present invention claimed in the appended claims. Such modifications should not be considered as departing from the technical idea or scope of the present invention.

In addition, terms used herein are for the purpose of describing specific embodiments only, but are not intended to limit the present invention. A singular form includes a plural form unless the context clearly indicates otherwise. Throughout this specification, it will be understood that the term "comprise" and variations thereof, such as "comprising" and "having," specify the presence of features, numbers, steps, operations, components, parts, or combinations thereof, described in the specification, but do not preclude the presence or addition of one or more other features, numbers, steps, operations, components, parts, or combinations thereof.

INDUSTRIAL APPLICABILITY

The present invention is applicable in the media contents-related industrial field.

The invention claimed is:

1. A non-transitory recording medium recorded with a multi-track media file which reproduces at least one audio file and at least one video file corresponding to the audio file, the multi-track media file comprising:
   a data part comprising a plurality of frames, the data part having a structure in which each frame of the audio file and each frame of the video file corresponding thereto are adjacently coupled with each other; and
   a header part which represents information on the total number of the audio files, and information on the total number of the video files,
   wherein each frame of the audio files and each frame of the video files are each provided with a frame header part which represents output adjustment values of the audio file and the video file in each frame; and
   in each frame, a sum of the output adjustment values of all the at least one audio file is 100%, and, in each frame, a sum of the output adjustment values of all the at least one video file is 100%.

2. The non-transitory recording medium of claim 1, wherein the frame header part includes information on file types of the frame included in the frame header part.

3. A method for editing a multi-track media file, comprising:
   (a) storing, by an apparatus for editing a media file, the multi-track media file including at least one audio track and at least one video track corresponding to the audio track, wherein the multi-track media file comprises a data part comprising a plurality of frames in which each frame of the at least one audio track and each frame of the at least one video track corresponding thereto are adjacently coupled with each other, and a header part, wherein each frame of the at least one audio track and each frame of the at least one video track comprises a frame header having an output adjustment value;
   (b) receiving, by the apparatus for editing the media file, an audio signal and/or a video signal from the outside;
   (c) additionally generating, by the apparatus for editing the media file, an audio track and/or a video track according to the audio signal and/or the video signal input in the step (b) in the multi-track media file;

(d) receiving, by the apparatus for editing the media file, an output adjustment command from a user to adjust an output of at least one frame among the frames of the audio file and the frames of the video file;

(e) generating, by the apparatus for editing the media file, an output adjustment value according to the output adjustment command;

(f) modifying the output adjustment value in the frame header of the at least one frame according to the output adjustment command, wherein, in each frame, a sum of the output adjustment values of the at least one audio track is 100%, and, in each frame, a sum of the output adjustment values of the at least one video track is 100%.

4. An apparatus for editing a multi-track media file, comprising:
a storage unit having the non-transitory recording medium of claim 1;
an input unit configured to receive an audio signal and/or a video signal from an outside; and
an editing unit configured to additionally generating an audio file and/or a video file according to the audio signal and/or the video signal input to the input unit in the multi-track media file.

5. The apparatus of claim 4, wherein the input unit receives an output adjustment command of the audio file and/or the video file from a user.

6. The apparatus of claim 5, wherein the editing unit generates a volume adjustment value according to the output adjustment command.

7. The apparatus of claim 6, wherein the editing unit records the generated volume adjustment value in the multi-track media file.

8. An apparatus for editing a multi-track media file, comprising:
a storage unit having the non-transitory recording medium of claim 1;
an input unit configured to receive an output adjustment command of the audio file and/or the video file from a user; and
an editing unit configured to generate a volume adjustment value according to the output adjustment command and record the generated volume adjustment value in the multi-track media file.

9. A method for editing a multi-track media file, comprising:
storing the multi-track media file comprising a first audio track and a first video track corresponding to the first audio track, the multi-track media file comprising a data part and a header part, the data part having a plurality of frames, each frame having an audio frame and a video frame, each of the audio frame and the video frame having a frame data and a frame header having an output adjustment value of 0% to 100% to adjust an output of the audio track and the video track in each frame;
receiving, by the apparatus for editing the media file, an input signal for at least one of an additional audio track and an additional video track;
generating the at least one of the additional audio track and the additional video track according to the input signal in the multi-track media file, wherein each frame of the additional audio and/or video track has an output adjustment value of 0 to 100%;
receiving, by the apparatus for editing the media file, an output adjustment command from a user to adjust an output of at least one frame in the multimedia file;
modifying the output adjustment value in the frame header of the at least one frame in the multimedia file, wherein, in each frame, a sum of the output adjustment values of all the audio tracks present in each frame is 100%, and, in each frame, a sum of the output adjustment values of all the video tracks present in each frame is 100%.

10. The method of claim 9, wherein the at least one of the additional audio track and the additional video track comprises the additional audio track and the additional video track.

* * * * *